(12) United States Patent
Lesser

(10) Patent No.: US 11,439,480 B2
(45) Date of Patent: Sep. 13, 2022

(54) ELASTIC MATRIX SYSTEM

(71) Applicant: Robyn B. Lesser, Clearwater, FL (US)

(72) Inventor: Robyn B. Lesser, Clearwater, FL (US)

(73) Assignee: SMILE BUILDERS INNOVATIONS LLC, Tampa, FL (US)

( * ) Notice: Subject to any disclaimer, the term of this patent is extended or adjusted under 35 U.S.C. 154(b) by 624 days.

(21) Appl. No.: 16/375,155

(22) Filed: Apr. 4, 2019

(65) Prior Publication Data

US 2020/0315742 A1 Oct. 8, 2020

(51) Int. Cl.
*A61C 5/85* (2017.01)

(52) U.S. Cl.
CPC ..................... *A61C 5/85* (2017.02)

(58) Field of Classification Search
CPC ....................................... A61C 5/85
See application file for complete search history.

(56) References Cited

U.S. PATENT DOCUMENTS

| | | | | |
|---|---|---|---|---|
| 2,288,011 A * | 6/1942 | Mizzy | ...................... | A61C 3/06 433/148 |
| 2,722,746 A * | 11/1955 | Edward | ................... | A61C 5/85 433/161 |
| 2,771,677 A * | 11/1956 | Curry | ....................... | A61C 5/85 433/39 |
| 2,790,238 A * | 4/1957 | Trangmar | ................. | A61C 5/85 433/39 |
| 3,491,447 A * | 1/1970 | Newman | .................. | A61C 5/85 433/139 |
| 4,202,103 A | 5/1980 | Zall et al. | | |
| 4,523,909 A * | 6/1985 | Lazarus | .................... | A61C 5/85 433/39 |
| 4,778,386 A * | 10/1988 | Spiry | ........................ | A61C 5/77 433/45 |
| 6,482,005 B1 | 11/2002 | Summer et al. | | |
| 9,277,975 B1 * | 3/2016 | Tapocik | ................. | A61C 15/00 |

(Continued)

FOREIGN PATENT DOCUMENTS

WO 2006007885 A1 1/2006

OTHER PUBLICATIONS

Non-Final Office Action for U.S. Appl. No. 16/214,871 dated Apr. 30, 2020.

(Continued)

*Primary Examiner* — Nicholas D Lucchesi
*Assistant Examiner* — Hao D Mai
(74) *Attorney, Agent, or Firm* — Thomas | Horstemeyer, LLP

(57) ABSTRACT

An elastic matrix system for use during a dental restoration process is provided. In one embodiment, among others, the matrix system may include a restoration band having an elongated body between a first end and a second end. The restoration band comprises a top edge and a bottom edge. The matrix system also includes an upper circular rim of elastic material that has a first channel. The top edge of the restoration band is positioned in the first channel, and the restoration band expands and contracts a circumference of the matrix system along the first channel as the upper circular rim is manipulated. The matrix system also includes a lower circular rim of elastic material that has a second channel. The elastic sleeve attaches the upper circular rim to lower circular rim.

13 Claims, 6 Drawing Sheets

(56) References Cited

U.S. PATENT DOCUMENTS

| | | |
|---|---|---|
| 2004/0152039 A1 | 8/2004 | Clegg et al. |
| 2011/0070555 A1 | 3/2011 | Anderson et al. |
| 2015/0182301 A1* | 7/2015 | Hegland .............. A61C 19/066 |
| | | 433/29 |
| 2018/0014913 A1 | 1/2018 | Fatiny |

OTHER PUBLICATIONS

F. Margolis, "Matrix Bands for Primary and Permanent Class II Composite Restorations". Dental Economics, Mar. 2009, pp. 1-6.
Patras et al. "Class II Composite Restorations and Proximal Concavities: Clinical Implications and Management". Operative Dentistry, 2013, 38-2, 119-124.
Palodent Plus vs. Tofflemire and Comparable Circumferential Matrix Devices. Dentsply, May 2016, 2 pages.

* cited by examiner

ELASTIC MATRIX SYSTEM

BACKGROUND

Dental restoration on certain teeth can be technique sensitive. Dentists have to maintain a dry and clean field while also shaping and restoring a tooth's anatomy. Depending on the tooth, dentists oftentimes use a matrix and a wedge during a dental restoration procedure. However, these dental tools and others can be problematic in certain scenarios.

SUMMARY

Embodiments of the present disclosure are related to an improved dental matrix system for dental restoration procedures on posterior primary (deciduous) or permanent teeth. In one non-limiting example, among others, an apparatus comprises a restoration band having an elongated body between a first end and a second end. The elongated body has a top edge and a bottom edge. The apparatus also comprises an upper circular rim of elastic material that has a first channel. The top edge of the restoration band is positioned in the first channel, and the restoration band expands and contracts a diameter of the apparatus along the first channel as the upper circular rim is manipulated. Further, the apparatus includes a lower circular rim of elastic material that has a second channel. The bottom edge of the restoration band is positioned in the second channel, and the restoration band expands and contracts the diameter of the apparatus along the second channel as the lower circular rim is manipulated. Also, the apparatus comprises an elastic sleeve that attaches the upper circular rim to lower circular rim. A portion of the restoration band passes through the elastic sleeve. The matrix band could also overlap and extend beyond the elastic sleeve allowing the extra portion of the band to be manipulated in a bend to further stabilize the matrix.

Further, in another non-limiting example, a method of installing a matrix system for a posterior tooth comprises providing a matrix system for a posterior tooth. The matrix system comprises an upper circular rim of elastic material that is attached to a lower circular rim of elastic material and a dental band is positioned between the upper circular rim of elastic material and the lower circular rim of elastic material. The matrix system comprises a first diameter. The method also includes inserting a first elongated member and a second elongated member of a dental instrument through a first exterior loop and a second exterior loop of the matrix system. The first exterior loop is diametrically opposite of the second exterior loop along a perimeter of the matrix system. The method further includes expanding, using the dental instrument, the matrix system to a second diameter by applying a force to move the first exterior loop and the second exterior loop of the matrix system away from a center of the matrix system. Additionally, the method comprises positioning the matrix system around the posterior tooth and releasing the force applied to the first exterior loop and the second exterior loop.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
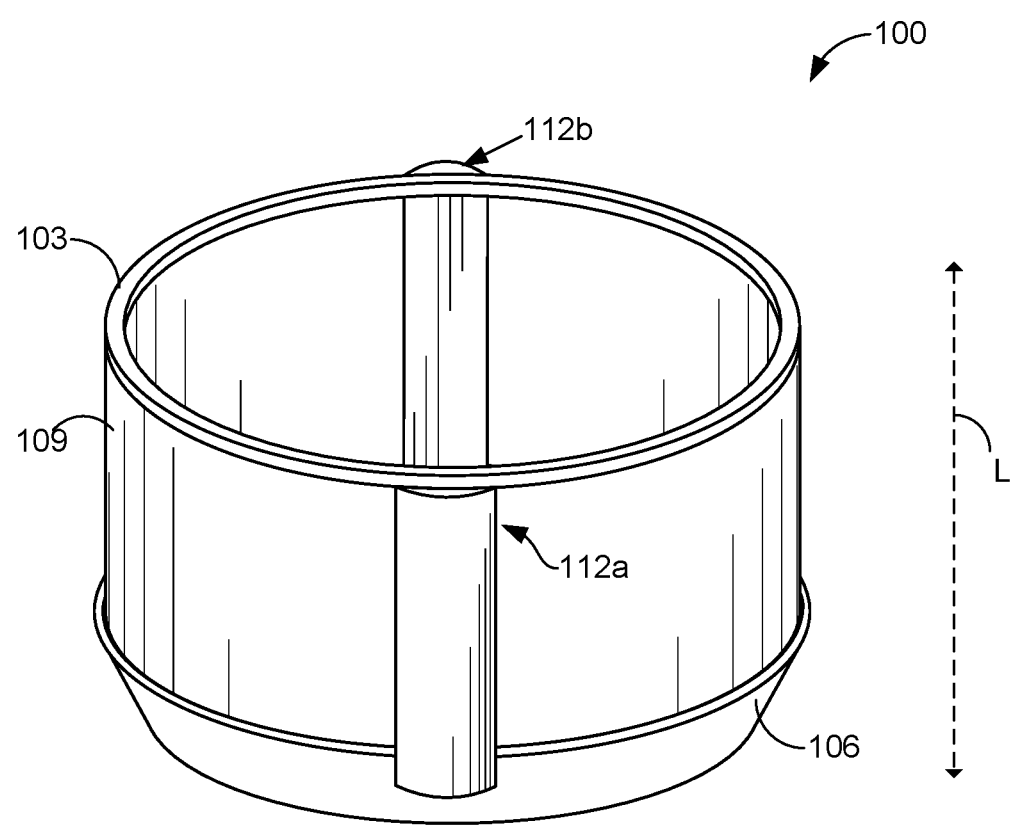
FIG. 1A is a perspective view of a matrix system, according to one embodiment described herein.

Dental restoration involves a process for restoring the function, integrity, and esthetic of teeth. During restoration procedures, dentists use an array of tools to maintain a dry and clean field while shaping and restoring a tooth's anatomy. Depending on the tooth being operated on, certain tools and restoration techniques may be required during a restoration procedure. For example, dentists oftentimes uses different techniques and tools for posterior teeth and anterior teeth.

Resin or glass ionomer restorations can be more affective when they are not contaminated by saliva and or blood. This can be difficult when restoring the interproximal surface (mesial or distal) of a tooth. Oftentimes, a matrix is used if the teeth are in contact with the proximal tooth. The matrix can enable the dentist to shape or mold the material with instruments, and the matrix prevents the materials from bonding to the adjacent tooth. The bonding materials used may include composite resins (whether packable or flowable), compomers, and glass ionomers.

Generally, for posterior teeth, a Stainless Steel matrix is used for dental restoration procedures. A Mylar matrix may also be used. However, the use of a posterior matrix can be technique sensitive because it requires the coordination of multiple tools during a procedure. Further, even though it is flexible, it does have a sharp edge that can cause bleeding to occur when placed into the sulcus of the gingiva. Additionally, the Mylar matrix oftentimes is used in combination with a wedge or stabilizer such as a Toeffelm ire retainer to help maintain the position of the matrix. The wedges can be used in order to ensure the matrix sufficiently seals off the restoration area of the tooth. These tools can be placed sub gingival. Wedges may also be traumatic to the tissue because they can cause the area to bleed and may impact the bond of the dentist's restorative material to the tooth. If a wedge or retainer/stabilizer is not used, the matrix may move during a restoration procedure. The retainers, wedge and stabilizers may be displaced by the patient's tongue, cheek or lip as well as the operator. As a result, the dentist may hold the matrix with their non-dominant hand while completing the restoration. This coordination of tools can be difficult when the backside or palatal side of the tooth is also being restored. A dentist would not be able to hold the dental mirror and the matrix while placing the materials all at the same time. This coordination of tools is even more challenging when restoring posterior teeth. These tools can also be painful or very uncomfortable for the patient. Patients are oftentimes given a numbing agent to help tolerate pain during the procedure.

The various embodiments of the present disclosure relate to an improved matrix system that can expand and contract its diameter for positioning around a particular tooth. The embodiments also can prevent bonding materials (e.g. resin and other materials) from attaching to an adjacent tooth and help the dentist achieve a smooth finish for the tooth being operated on. Additionally, the embodiments can self-stabilize its position around a posterior tooth, which eliminates the need for other dental tools used in existing matrixes, such as wedges. Further, the embodiments are comprised of materials that cause less trauma on the gingiva (e.g. gums) of a patient, which results in less bleeding and irritation during a procedure. Additionally, various aspects of the embodiments address needs of composite restorations, such as a tight contact for sealing off a restoration area and a good contour of a posterior tooth.

Figure 1B:
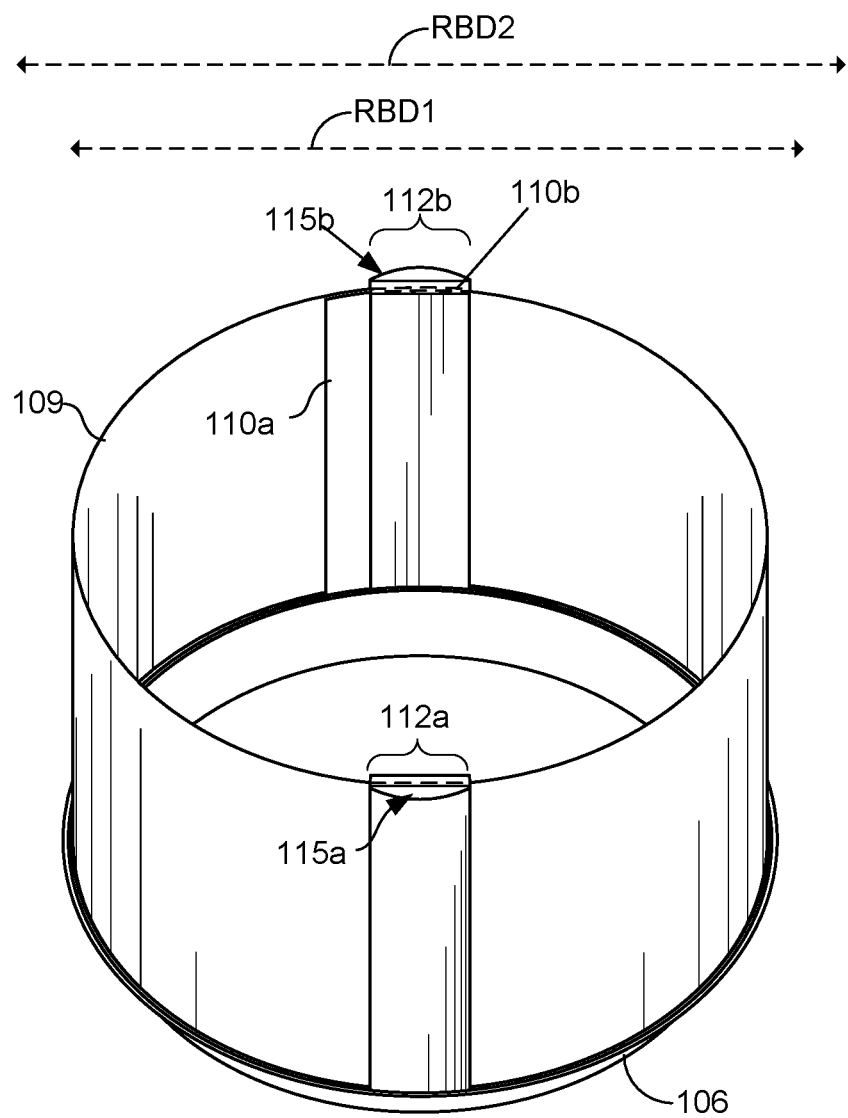
FIG. 1B is a cross-sectional view of the matrix system from FIG. 1A with the upper circular rim omitted, according to one embodiment described herein.
Figure 1C:
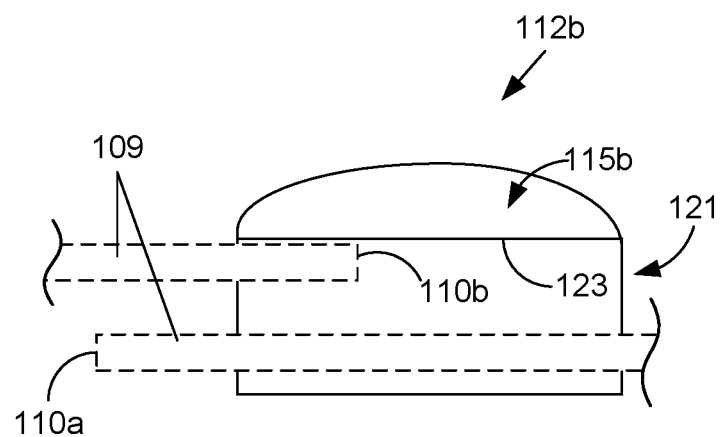
FIG. 1C is a top view of a sleeve and an exterior loop of the matrix system from FIG. 1A, according to one embodiment described herein.

With reference to FIG. 1A, shown is a perspective view of a matrix system 100, according to one embodiment described herein. The matrix system 100 includes an upper circular rim 103, a lower circular rim 106, and a restoration band 109. FIG. 1B also illustrates a cross sectional view of the matrix system 100 from FIG. 1A, in which the upper circular rim 103 is omitted from view. FIG. 1C illustrates a top view of the second sleeve 112b in FIG. 1B.

The upper circular rim 103 can be used to restrain a top portion of the restoration band 109, and the lower circular rim 106 can be used to restrain a bottom portion of the restoration band 109. A first sleeve 112a and a second sleeve 112b (collectively "sleeves 112") can be used to attach the upper circular rim 103 to the lower circular rim 106.

Figure 2A:
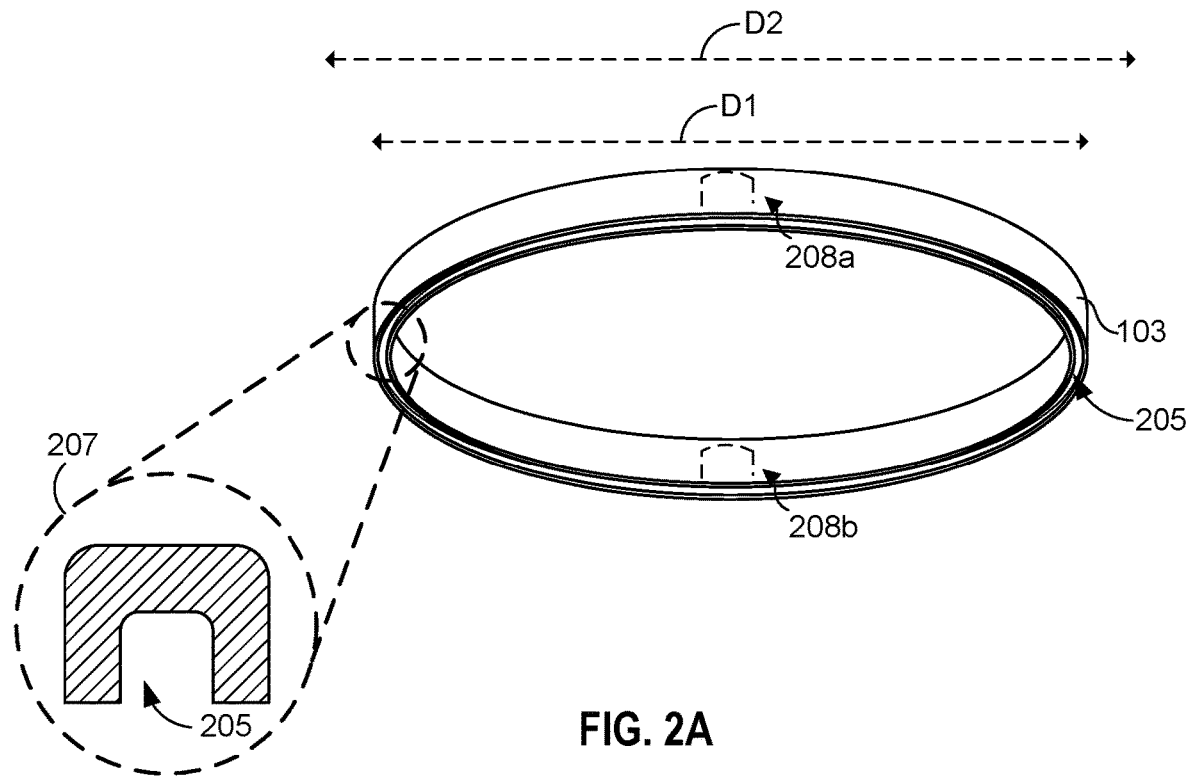
FIG. 2A illustrates a perspective view of an underside of the upper circular rim of the matrix system from FIG. 1A, according to one embodiment described herein.

The upper circular rim 103 can be comprised of an elastic material that enables the upper circular rim 103 to expand and contract its diameter (FIG. 2A). The elastic material can also be useful for preventing liquids (e.g. blood, salvia, etc.) from entering a tooth area within the matrix system 100. By sealing off the tooth from liquids, the matrix system 100 prevents the tooth area from contamination during a restoration procedure. Further, the elastic properties of the upper circular rim 103 can enable it to conform to the shape of the tooth being operated on by a dentist. The elastic material may include rubber, elastomer, latex, silicon, or other suitable elastic materials.

Figure 2B:
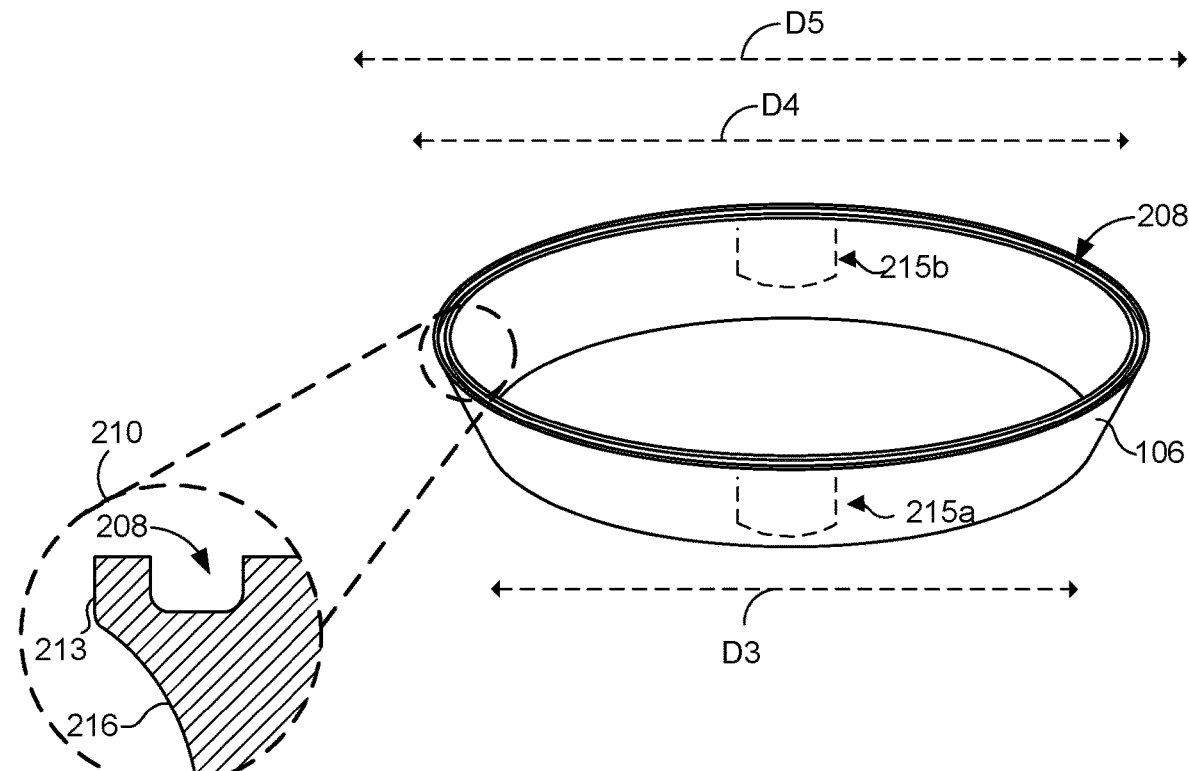
FIG. 2B illustrates a top perspective view of the lower circular rim of the matrix system from FIG. 1A, according to one embodiment described herein.

The lower circular rim 106 can be used to position the matrix system 100 around a particular posterior tooth at a gum line (e.g. sub gingiva). A bottom portion of the lower circular rim 106 can be positioned below the gum line (e.g. sub gingiva), and a top portion of the lower circular rim 106 can be positioned above the gum line. The top portion of the lower circular rim 106 can be of a sufficient height to prevent liquid around the gum line from accessing the tooth area. The lower circular rim 106 can be comprised of an elastic material that enables the lower circular rim 106 to expand and contract its diameter (FIG. 2B). Further, the elastic material of the lower circular rim 106 can be compressed to contract its thickness to fit between teeth. After the lower circular rim 106 has passed through a tight area, the thickness of the lower circular rim 106 can expand after the release of the compressed force. The elastic material may include rubber, elastomer, latex, silicon or other suitable elastic materials.

The restoration band 109 is used to seal off portions of the posterior teeth during a restoration procedure. The restoration band 109 can have an elongated body between a first end 110a and a second end 110b, and the restoration band also includes a top edge and a bottom edge. As illustrated in FIG. 1B, the second end 110b of the restoration band is attached to an interior surface of a pass-through area of the second sleeve 112b. The first end 110a of the restoration band 109 is unattached, and FIG. 1B illustrates that the first end 110a is coiled inward. The restoration band 109 may be a Mylar band, a stainless steel strip, and other suitable dental restoration bands.

The matrix system 100 also comprises a first sleeve 112a and a second sleeve 112b, as shown in FIG. 1A. In some embodiments, the matrix system 100 may include a single sleeve 112. The sleeves 112 include an opening through which a restoration band 109 can pass though. The openings for the sleeves 112 enable the restoration band to pass through the sleeves 112 and around the perimeter of the matrix system 100. In some embodiments, the sleeves 112 are comprised of an elastic material. The elastic material may include rubber, elastomer, latex, silicon or any other elastic type material.

The sleeves 112 can also comprise exterior loops 115a,b (collectively exterior loops 115) attached to an exterior surface of the sleeves 112. The exterior loops 115 form a vertical opening. As a non-limiting example, FIG. 1C illustrates a top view of the second sleeve 112b and exterior loop 115b. FIG. 1C also illustrates that the second end 110b of the restoration band can be attached to an interior surface 123 of the second sleeve 112b. The first end 110a can be unattached and is free to move in and out of the opening 121 of the second sleeve 112b. The vertical opening of the exterior loops 115 can be substantially perpendicular to the opening 121 associated with the sleeves 112. The exterior loops 115 can enable a dental tool to position the matrix system 100 around a posterior tooth. A dental tool may include a dental cotton plier, Howe plier, separator plier, Mathieu plier, and other suitable dental tools. For example, a two-pronged dental tool may be used to position the matrix system 100. Each prong may be inserted in and through the vertical opening of a respective exterior loop 115. The dental tool can be used to move the exterior loops 115 in opposite directions away from a center of the matrix system 100 in order to expand its diameter. In an expanded state, the matrix system 100 can be positioned around a posterior tooth, and the dental tool can be used to release the exterior loops 115. In some embodiments, among others, the matrix system 100 can have a length "L" in a range between 2.5 mm and 20 mm. The length "L" can represent a vertical length from a bottom of the lower circular rim 106 to a top of the upper circular rim 103. In these embodiments, the length "L" may be at least as long as a length of a crown of a posterior tooth.

Next, a general description of the operation of the various embodiments of the matrix system 100 is provided. To begin, it is assumed that a patient is seeking assistance with a dental restoration of a posterior tooth in this non-limiting example. The dentist can identify a size of the posterior tooth, which may involve identifying a posterior tooth diameter, a circumstance of the posterior tooth, or some other suitable dimension associated with a posterior tooth. The tooth dimensions can assist the dentist in identifying a matrix system 100 that will fit and sufficiently conform to the shape of the tooth. In some embodiments, the embodiments of the matrix system 100 can be manufactured with different diameters.

After a selecting an appropriately sized matrix system 100, the dentist can use a dental instrument with two pronged members. Each prong can be inserted into one of the exterior loops 115 of the matrix system 100. The dental instrument can be used to move the exterior loops 115 away from a center of the matrix system 100. The force applied by the dental instrument can causes the elastic material of the upper circular rim 103 and the lower circular rim 106 to expand. Accordingly, the diameter of the upper circular rim 103 and the lower circular rim 106 can expand. In this non-limiting example, prior to forcing the exterior loops 115 away from a center point, the matrix system 100 may a first diameter that was smaller than a diameter of the posterior tooth or substantially equal in diameter to the posterior tooth. While the exterior loops 115 are forced away from the center point, the matrix system 100 has a second diameter that is larger than the diameter of the posterior tooth.

As the upper circular rim 103 and the lower circular rim 106 are expanded, the restoration band 109 uncoils to expand its diameter. The restoration band 109 uncoils along the first annular channel (FIG. 2A) of the upper circular rim 103 and along the second annular channel (FIG. 2B) of the lower circular rim 106. In this non-limiting example, the first end 110a of the restoration band 109 may move in a clockwise direction toward the second sleeve 112b, through the second sleeve 112b, and then toward the first sleeve 112a as the diameter is expanded. Accordingly, the restoration band 109 may have a first diameter (FIG. 1B "RBD1") in its initial state, and then, the restoration band 109 may have a second diameter (FIG. 1B "RDB2") in an expanded state. The expansion of the upper circular rim 103 and the lower circular rim 106 can cause the restoration band to expand or uncoil. In some non-limiting examples, matrix system 100 may expand in a range between 1 and 5 millimeters.

In an expanded state, the dentist can proceed to place the matrix system 100 around the posterior tooth. Next, the dentist can release the exterior loops 115. By releasing the force applied to the exterior loops 115, the diameter of the matrix system 100 contracts. The contraction of the matrix system 100 enables it to conform to the shape of the posterior tooth. As the matrix system 100 contracts, the first end 110a of the restoration band 109 may move in a counter-clockwise direction. Assuming that the first end 110a is presently to the right of the second sleeve 112b, the first end 110a can move through the second sleeve 112b and toward the first sleeve 112a, where the overlapped extended matrix may be manipulated into a fold for increased stabilization.

With reference to FIG. 2A, shown is a perspective view of an underside of the upper circular rim 103 of the matrix system 100 from FIG. 1A. FIG. 2A illustrates that the upper circular rim 103 comprises a first annular channel 205 for receiving a top edge of the restoration band 109. Reference number 207 illustrates an enlarged cross-sectional view of the upper circular rim 103. The enlarged view 207 illustrates a cross-sectional view of the first annular channel 205. The first annular channel 205 can be used to receive a top edge of the restoration band 109. The top edge of the restoration band 109 can expand and contract along the first annular channel 205. FIG. 2A also illustrates top attachment points 208a,b for the sleeves 112. In some embodiments, an exterior surface of the sleeves 112 may attach to an exterior surface of the upper circular rim 103. Then, an inner surface of the sleeves 112 may attached to an inner surface of the upper circular rim 103. In other words, the sleeves 112 may attach to both the outer and inner surfaces of the upper circular rim 103.

Further, the upper circular rim 103 have an initial first diameter D1. Then, the upper circular rim 103 may be expanded to a second diameter D1 in response to a force pulling the exterior loops 115 and/or the sleeves 112 away from the center. In some embodiments, the exterior loops 115 (FIG. 1A) may be omitted, and the upper circular rim 103 may be expanded by pulling on at least one point along its perimeter. In some non-limiting examples, the upper circular rim 103 may contract to a diameter that is more than diameter D1 and less than diameter D2 in order to conform to a shape of a posterior tooth.

Moving on to FIG. 2B, shown is a top perspective view of the lower circular rim 106 of the matrix system 100 from FIG. 1A. FIG. 2B illustrates that the lower circular rim 106 includes a second annular channel 208 for receiving a bottom edge of the restoration band 109. In FIG. 2B, reference number 210 refers to an enlarged cross-sectional view of a portion of the lower circular rim 106. Reference number 210 illustrates an enlarged view of the second annular channel 208. In some embodiments, the first annular channel 205 and the second annular channel 208 may be substantially in vertical alignment (FIG. 1A). Reference number 210 also illustrates that the lower circular rim 106 includes an exterior annular rim 213. Further, reference number 210 illustrates that the outer surface 216 of the lower circular rim 106 includes a curved or concave shape.

FIG. 2B also illustrates bottom attachment points 215a,b for the sleeves 112. In some embodiments, an exterior surface of the sleeves 112 may attach to an exterior surface of the lower circular rim 106. Then, an inner surface of the sleeves 112 may attach to an inner surface of the lower circular rim 106. In other words, the sleeves 112 may attach to both the outer and inner surface of the lower circular rim 106. The lower portion of the lower circular rim 106 may have a diameter D3 that is smaller than a diameter D4 associated with a top portion of the lower circular rim 106. Diameter D4 can be associated with the exterior annular rim 213. Diameter D4 can be larger than Diameter D3. Accordingly, the lower circular rim 106 have a tapered shape. FIG. 2B also illustrates a diameter 5 that can represent an expanded diameter for diameter D3 and/or D4 in an expanded state from the expansion of the lower circular rim 106.

Figure 3A:
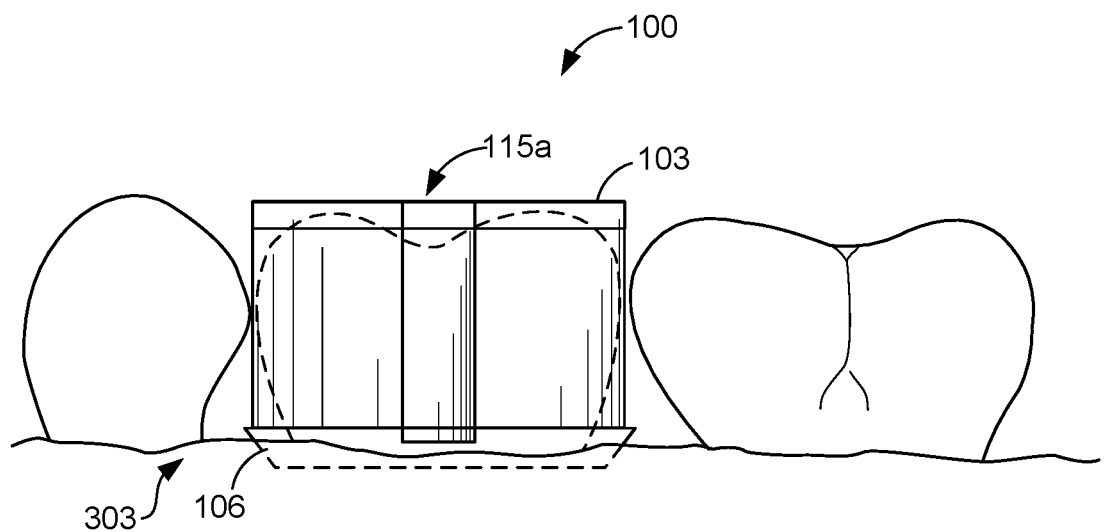
FIG. 3A illustrates a side view of the matrix system positioned around a posterior tooth, according to one embodiment described herein.
Figure 3B:
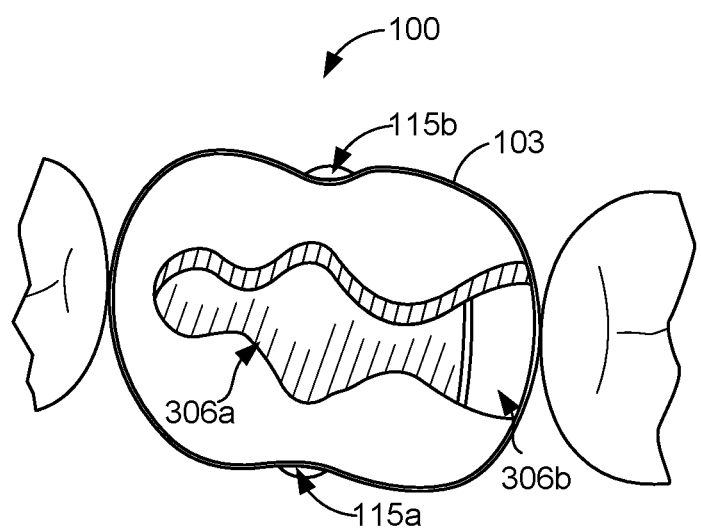
FIG. 3B illustrates a top view of the matrix system positioned around a posterior tooth in FIG. 3A, according to one embodiment described herein.

With reference to FIG. 3A, shown is a side view of the matrix system 100 positioned around a posterior tooth. As illustrated, a bottom portion of the lower circular rim 106 has been portioned sub gingiva 303 (e.g. below the gum line). FIG. 3B illustrates a top view of the matrix system 100 positioned around the posterior tooth in FIG. 3A. Further, in FIG. 3A, the lower circular rim 106 is positioned such that the exterior annular rim 213 is above the gingiva 303. The elastic material of the lower circular rim 106 is an improvement over existing solution because it causes less trauma to the gingiva 303 than existing solutions. Specifically, the elastic material of the lower circular rim 106 has a softer surface and is not as sharp as existing solutions. Accordingly, the gingiva 303 is less likely to bleed and become irritated. As a result, the patient has a better experience during the dental restoration procedure.

In some non-limiting examples, the exterior annular rim 213 may be used to self-stabilize the matrix system 100. In some scenarios, the exterior annular rim 213 may contact an adjacent tooth. The combination of the lower circular rim 106 and the restoration band 109 seal off the posterior tooth from liquids entering a restoration area 306a,b.

Figure 4:
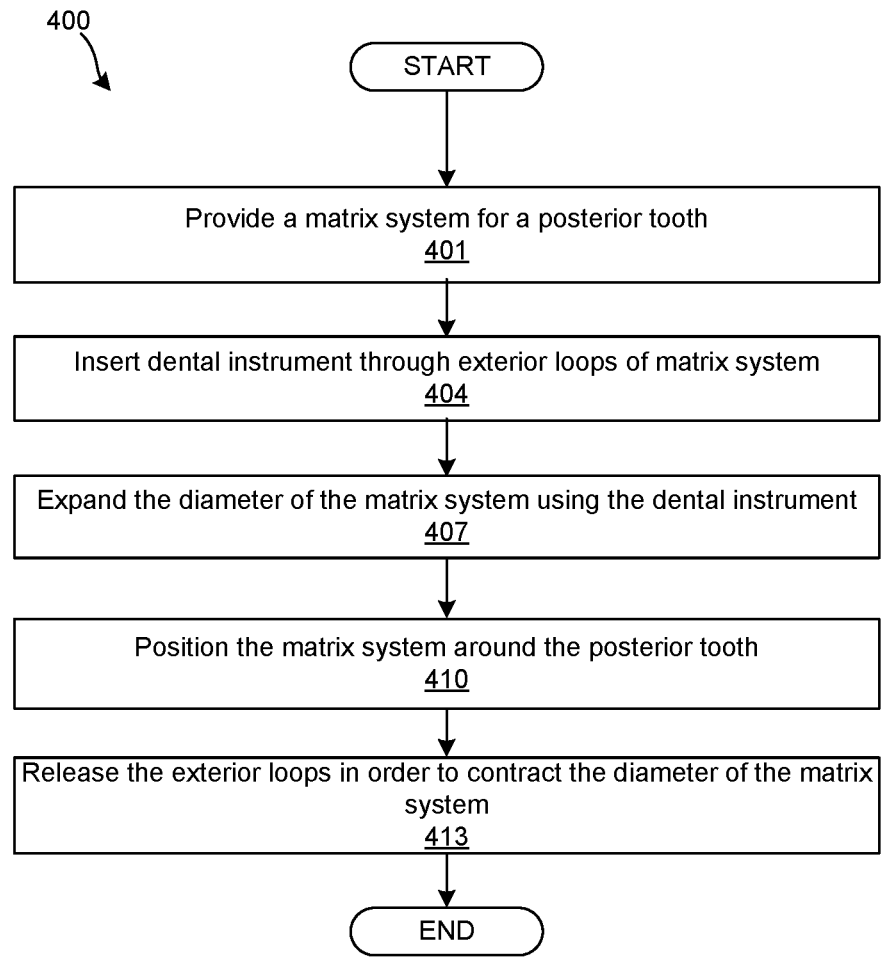
FIG. 4 is a flow chart illustrating an example method of use of the matrix system from FIG. 1A, according to various embodiments of the present disclosure

With reference to FIG. 4, shown is a flowchart that provides one example of a method of use for the matrix system 100 from FIG. 1A according to various embodiments. Particularly, FIG. 4 illustrates a flow chart for an example process 400 for installing the matrix system 100.

Beginning with box 401, the process 400 involves providing a matrix system 100 for a posterior tooth. The matrix system 100 can be selected based on a diameter of a tooth. The matrix system 100 can comprise an upper circular rim 103 of elastic material that is attached to a lower circular rim 106 of elastic material. A restoration band 109 is positioned between the upper circular rim 103 and the lower circular rim 106. The matrix system 100 comprises a first diameter that is smaller than a diameter of the posterior tooth.

In box 404, the process 400 involves inserting a first elongated member and a second elongated member of a dental instrument through a first exterior loop 115 and a second exterior loop 115 of the matrix system 100. The first exterior loop 115 is diametrically opposite of the second exterior loop 115 along a perimeter of the matrix system 100.

In box 407, the process 400 involves expanding, using the dental instrument, the matrix system 100 to a second diameter by moving the first exterior loop 115 and the second exterior loop 115 of the matrix system 100 away from a center of the matrix system 100. In some embodiments, the matrix system 100 can be expanded without the use of a dental instrument.

In box 410, the process 400 involves positioning the matrix system 100 around the posterior tooth while the matrix system 100 is in its expanded state. The lower portion of the lower circular rim 106 can be positioned below the gingiva 303, and the exterior annular rim 213 can be positioned below the gingiva 303. In some embodiments, the lower circular rim 106 has to be compressed to contract its thickness. By compressing the thickness, the lower circular rim 106 can be slide through tight areas between teeth. After passing through a tight area, the thickness of the lower circular rim 106 can expand.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An apparatus for use when performing a dental restoration process, comprising:
a restoration band having an elongated body between a first end and a second end, the elongated body having a top edge and a bottom edge and conforming to a circular shape configured to surround a tooth;
an upper circular rim of elastic material that has a first channel, wherein the top edge of the restoration band is positioned in the first channel, an expansion and contraction of the upper circular rim causes the restoration band to uncoil and coil, and the uncoiling and coiling of the restoration band causes a first diameter of the restoration band along the first channel to expand and contract;
a lower circular rim of elastic material that has a second channel, wherein the bottom edge of the restoration band is positioned in the second channel, an expansion and contraction of the lower circular rim causes the restoration band to uncoil and coil, and the uncoiling and coiling of the restoration band causes a second diameter of the restoration band along the second channel to expand and contract; and
an elastic sleeve that attaches the upper circular rim to the lower circular rim with the restoration band extending therebetween the upper circular rim and the lower circular rim, wherein a portion of the restoration band passes through the elastic sleeve.

2. The apparatus of claim 1, wherein the elastic sleeve comprises a first elastic sleeve, and the apparatus further comprises a second elastic sleeve that is diametrically opposed along a circumference of the apparatus.

3. The apparatus of claim 2, wherein the first elastic sleeve comprises a first exterior loop, and the second elastic sleeve comprises a second exterior loop.

4. The apparatus of claim 3, wherein a first opening of the first elastic sleeve is about perpendicular to a second opening of the first exterior loop.

5. The apparatus of claim 1, wherein the lower circular rim of elastic material comprises a top portion and a bottom portion, wherein the lower circular rim has a tapered shape in which the top portion has a larger circumference than the bottom portion.

6. The apparatus of claim 1, wherein the restoration band comprises a matrix band or a stainless steel matrix band.

7. The apparatus of claim 1, wherein the tooth is a posterior tooth, and a length of the apparatus substantially corresponds to a length of a crown of the posterior tooth being operated on for dental restoration.

8. The apparatus of claim 1, wherein the lower circular rim of elastic material or the upper circular rim of elastic material is comprised of a rubber material.

9. The apparatus of claim 1, wherein a thickness of the lower circular rim of elastic material can be manipulated to a contracted state by a compressed force.

10. The apparatus of claim 9, wherein the thickness of the lower circular rim of elastic material can expand from the contracted state after the compressed force has been released.

11. The apparatus of claim 1, wherein the lower circular rim of elastic material has a top portion that includes an outer annular rim that has a larger diameter than a bottom portion of the lower circular rim.

12. The apparatus of claim 1, wherein the first channel of the upper circular rim and the second channel of the lower circular rim are substantially in vertical alignment.

13. The apparatus of claim 1, wherein the lower circular rim comprises an exterior annular rim.

* * * * *